(12) United States Patent
Burstein et al.

(10) Patent No.: US 6,885,243 B2
(45) Date of Patent: Apr. 26, 2005

(54) DYNAMIC, DIGITALLY CONTROLLED, TEMPERATURE COMPENSATED VOLTAGE REFERENCE

(75) Inventors: Steven Burstein, Smithtown, NY (US); Len Bekker, Central Islip, NY (US); Jay D. Popper, Jamaica, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 165 days.

(21) Appl. No.: 10/452,697

(22) Filed: Jun. 2, 2003

(65) Prior Publication Data

US 2004/0243950 A1 Dec. 2, 2004

(51) Int. Cl.[7] ............................................. H03F 3/45
(52) U.S. Cl. .................... 330/252; 330/256; 323/313
(58) Field of Search ............................. 330/252, 256; 323/313, 315; 327/540

(56) References Cited

U.S. PATENT DOCUMENTS

| | | | |
|---|---|---|---|
| 5,079,516 A | 1/1992 | Russell et al. | |
| 5,935,466 A | 8/1999 | Knudsen | |
| 6,118,384 A | * 9/2000 | Sheldon et al. | 340/636.15 |
| 6,292,050 B1 | 9/2001 | Dooley et al. | |
| 6,486,646 B2 | 11/2002 | Kang | |
| 6,515,464 B1 | * 2/2003 | Darmawaskita et al. | 324/76.11 |
| 2003/0155975 A1 | * 8/2003 | Ivanov et al. | 330/256 |

* cited by examiner

Primary Examiner—Patricia Nguyen
(74) Attorney, Agent, or Firm—Meyertons Hood Kivlin Kowert & Goetzel, P.C.; Jeffrey C. Hood

(57) ABSTRACT

A voltage reference is dynamically and digitally controlled by a digital function. The digital function may be implemented as a digital calculation or look up table. Inputs to the function include a modifiable trim value stored in a trim register, and a substrate temperature value. The preset value of the trim register is a trim preset value generated by cutting fuses and/or leaving fuses uncut. The cutting may be performed using laser trimming-devices. The output of the digital function is a corrected reference trim value that controls the gain of a voltage reference amplifier whose input is a band gap based voltage reference, and whose output is a derived voltage reference. The substrate temperature value is provided by a monolithic temperature monitor whose sensor may be on the same die as the derived voltage reference. The derived voltage reference provides a stable reference voltage that is dynamically and digitally controllable, to a host system that requires a voltage reference.

26 Claims, 5 Drawing Sheets

DYNAMIC, DIGITALLY CONTROLLED, TEMPERATURE COMPENSATED VOLTAGE REFERENCE

BACKGROUND OF THE INVENTION

1. Field of the Invention

This invention relates generally to the field of analog integrated circuit design and, more particularly, to voltage reference design.

2. Description of the Related Art

In the design of most analog integrated circuits, more specifically when using complementary metal-oxide-semiconductor (CMOS) technology, a stable reference voltage is often required to insure proper circuit operation. Functional circuit elements of these integrated circuits often employ current sources that are expected to provide stable currents. Such circuit elements can be current mirrors, differential amplifiers or operational amplifiers. Because field effect transistors are commonly used to implement current sources, the stability of such current sources is greatly affected by the stability and accuracy of the reference voltage applied to the gate of the field effect transistor (FET).

An example of an integrated circuit function that requires a precise voltage reference is an analog to digital converter (ADC). Other examples may include analog filters whose gain and rolloff frequency characteristics are dependent upon their bias currents. In another example, control circuits designed to control the switching response of logic circuits often employ a series FET whose gate is controlled by a reference voltage, affecting the slew rate and/or switching speed of the control circuit. Voltage references in such control circuits are preferred to provide accurate and stable reference voltages.

Typically, voltage reference values need to be adjusted to account for possible process variations. When working within generally tight operational tolerances, a trim capability of the circuit may be required to make the necessary adjustments needed for achieving proper circuit operation over variations present in silicon processing. This trim capability is commonly implemented by way of fuses that are usually cut, or uncut, for adjusting the reference voltage. Often, the trimming is performed by probing wafers during device characterization, determining the required trim, then cutting the fuses using laser trimming-devices. This method, however, may not provide sufficient control over the voltage reference since it is used during characterization and probe, not during normal circuit operations. For example, temperature variations in the die may cause a reference voltage drift during normal operations. Since the fuses are cut during characterization and probe, they would provide no means of controlling such a drift. While it is possible to control the drift during normal circuit operations using complex analog circuits, such methods are in many cases impractical and limited by die size and other factors. A more viable solution may be to employ methods utilizing simpler, more efficient digital control functions.

Therefore, there exists a need for a system and method for dynamically and digitally controlling a voltage reference, compensating for the reference voltage drift caused by temperature variations.

SUMMARY OF THE INVENTION

In one set of embodiments, the invention comprises a system and method for dynamically and digitally controlling a temperature compensated voltage reference. In one embodiment, the system comprises an original voltage reference, a storage element, a digital function, a set of fuses, and a voltage reference amplifier. The fuses may be used to control a preset value of the storage element, also referred to as a trim preset value, which may be changed by trimming (cutting) or not trimming the fuses. In one embodiment, the trimming is accomplished with the use of a laser. An output of the storage element may provide an intermediate trim value to the digital function. The original voltage reference may be coupled to an input of the voltage reference amplifier.

In one embodiment, the digital function controls the gain of the voltage reference amplifier. In this embodiment, the output of the voltage reference amplifier is a derived voltage reference, which corresponds to a corrected input voltage reference. A monolithic temperature monitor may also be coupled to a respective input port of the digital function, and provide a substrate temperature value as an input value to the digital function. A sensor of the monolithic temperature monitor may be situated on the same die as the derived voltage reference. The digital function may be implemented as digital calculation or as a lookup table. In one embodiment, the original voltage reference is derived from a band gap reference.

Thus, various embodiments of the invention may provide a means for dynamically, digitally controlling a voltage reference by way of employing a completely digital function to control the gain of a voltage reference amplifier whose input may be a band gap derived voltage reference, and whose output may be a derived voltage reference corresponding to the controlled input voltage reference. Inputs to the digital function may include a programmable trim value and a substrate temperature value provided by a temperature monitor.

BRIEF DESCRIPTION OF THE DRAWINGS

The foregoing, as well as other objects, features, and advantages of this invention may be more completely understood by reference to the following detailed description when read together with the accompanying drawings in which.

DETAILED DESCRIPTION OF THE PREFERRED EMBODIMENTS

Figure 1:
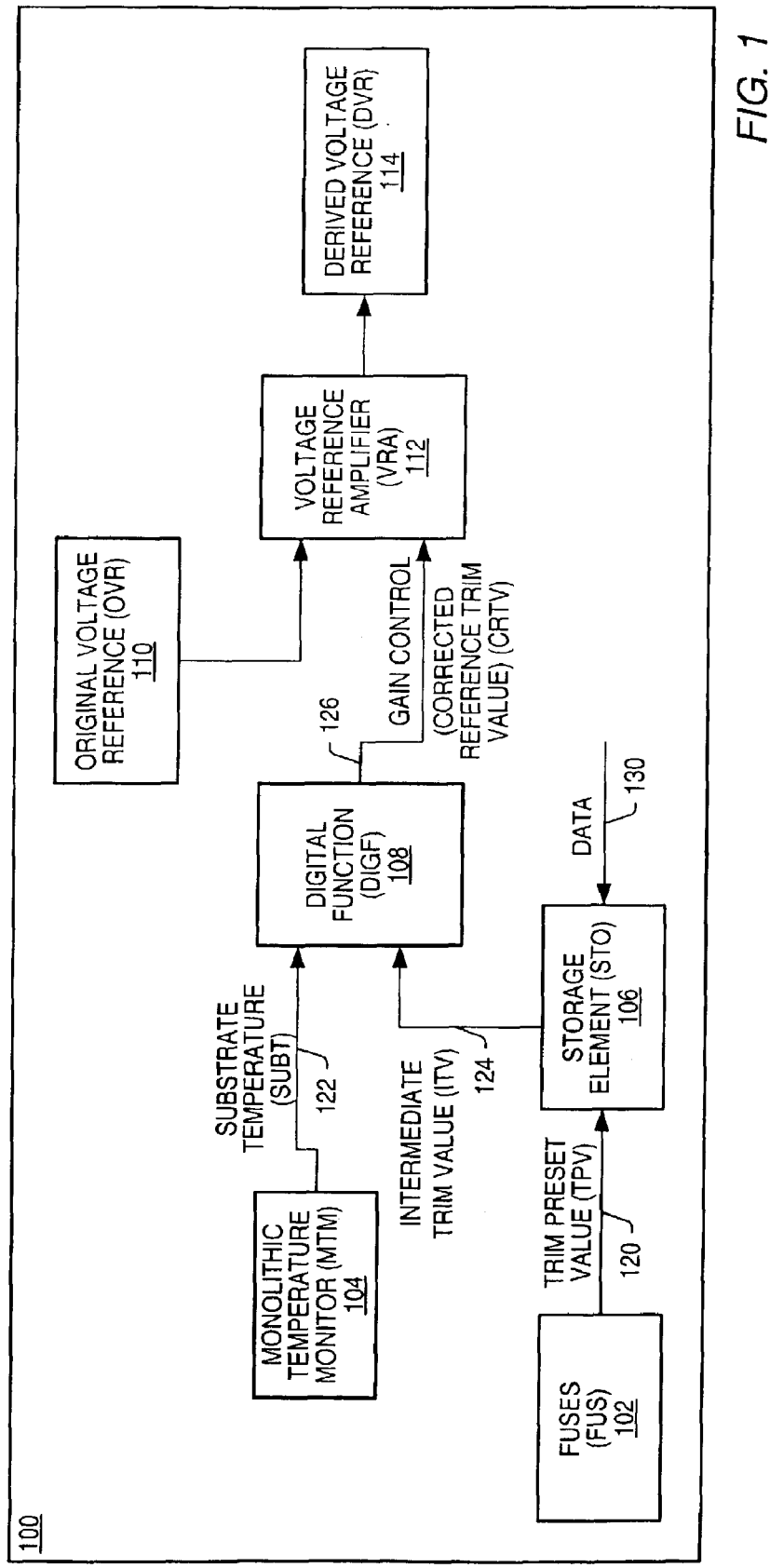
FIG. 1 illustrates a reference voltage system implemented in accordance with one set of embodiments of the present invention.

FIG. 1 illustrates the block diagram of a voltage reference system 100 implemented in accordance with one set of embodiments of the present invention. In one embodiment, the system comprises a voltage reference amplifier (VRA) 112, a storage element (STO) 106, a set of fuses (FUS) 102, a digital function (DIGF) 108, and a monolithic temperature monitor (MTM) 104. The set of fuses may comprise any number of fuses. The fuses may be used to control the value of a trim preset value (TPV) 120, which may be used by STO 106 as an input preset value. Data 130 may also be stored in STO 106, resulting in STO 106 providing an intermediate trim value (ITV) 124 as an input to DIGF 108. In one embodiment, an output of MTM 104 is also coupled to DIGF 108, supplying a measured substrate temperature value (SUBT) 122 as an input to DIGF 108. Corrected reference trim value (CRTV) 126 is an output of DIGF 108 and is used to control a gain of VRA 112. In one embodiment the input of VRA 112 is an original voltage reference (OVR) 110, and the output is a derived voltage reference (DVR) 114, which may be used by a host system as a controlled voltage reference.

Figure 2:
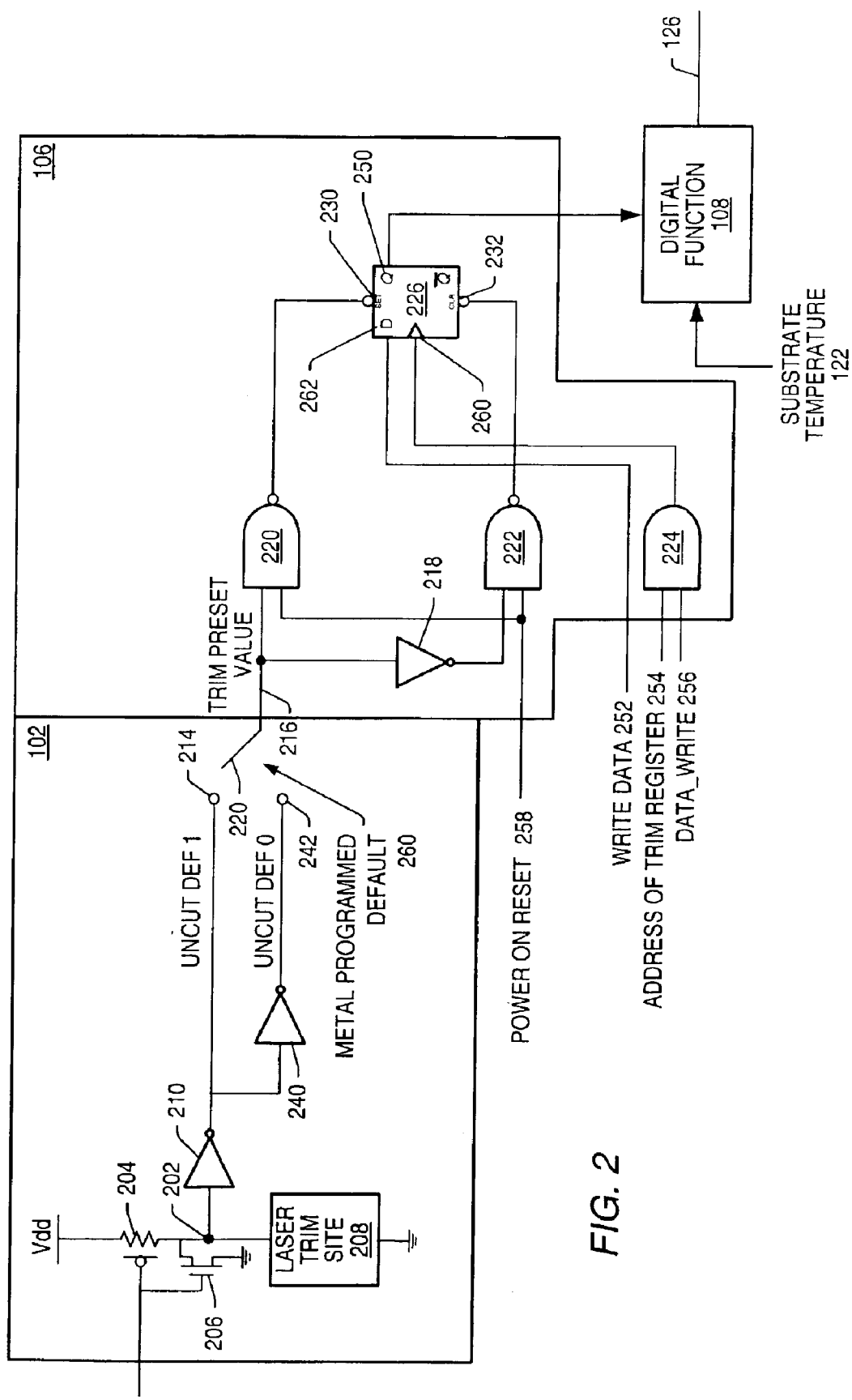
FIG. 2 illustrates a more detailed implementation of the system in FIG. 1.

FIG. 2 illustrates a more detailed diagram of voltage reference system 100, with one embodiment of FUS 102 and one embodiment of STO 106. A single fuse may comprise a resistive (long channel) PMOS transistor 204 and an NMOS transistor 206, with the source of 204 coupled to a logic level "1" and the drain of 204 coupled to the drain of 206, with the drain of 206 and the source of 206 coupled to ground. Laser trim site 208 indicates where a cut may be made. When 208 is cut, output node 202 is pulled up to a logic level "1", otherwise (when uncut), it remains at a logic level "0". In one embodiment, inverters 210 and 240 provide a means of programming the value of node 202 in metal for future manufacturing (metal programmed default 260), once such a value has been ascertained during probe and characterization of the future manufacturing process. In this embodiment, node 214 represents a logic value of "1" while node 242 represents a logic value of "0". A switch connection 220 may determine which value will be set at node 216 representing TPV 120.

TPV 120 may be used to control a set input 230 and/or clear input 232 of D flip-flop 226 through coupling logic comprising NAND gates 220 and 222, and inverter 218. Power On Reset 258 may be coupled to NAND gate 222 and used for resetting D flip-flop 226. FIG. 2 shows one single D flip-flop to represent storing a single bit, which may be one of multiple bits all comprising a TPV 216 value. In other words, there may be multiple nodes corresponding to 216, with each node representing a single bit in a multiple bit representation of a TPV 216 value. Output Q 250 of D flip-flop 226 carries ITV 124 to DIGF 108. Again, Q 250 may represent one of multiple bits comprising the value of ITV 124, each bit represented in a manner similar to Q 250. In addition to TPV 216, values stored in D flip-flop 226 may also be modified by writing to D flip-flop 226 through a trim register address line 254 and a data_write enable signal 256, which are both coupled to clock input 260 through AND gate 224. A data signal 252 may be coupled to D input 262. Signals 252, 254, 256 and 258 may be written by a host system and/or tester, setting ITV 124 as required. Similarly, ITV 124 may also be read by the host system and/or tester, to determine in part if ITV 124 needs to be modified.

In one embodiment, the sensor of MTM 104 is on the same die as DVR 114, and is used to characterize a reference voltage drift versus measured temperature. As a result, SUBT 122 may be used by DIGF 108 along with ITV 124 to generate CRTV 126, which may control the gain of VRA 112 resulting in DVR 114. DIGF 108 is all digital and dynamic control is possible during operation of a host system containing voltage reference system 100. In one embodiment, a trimming of FUS 102 may be obtained to a default temperature during characterization and probe, resulting in a determined value of TPV 120. ITV 124 may be set for an operating temperature range by changing the value of STO 106 during testing until a desired ITV 124 value has been obtained.

Figure 3:
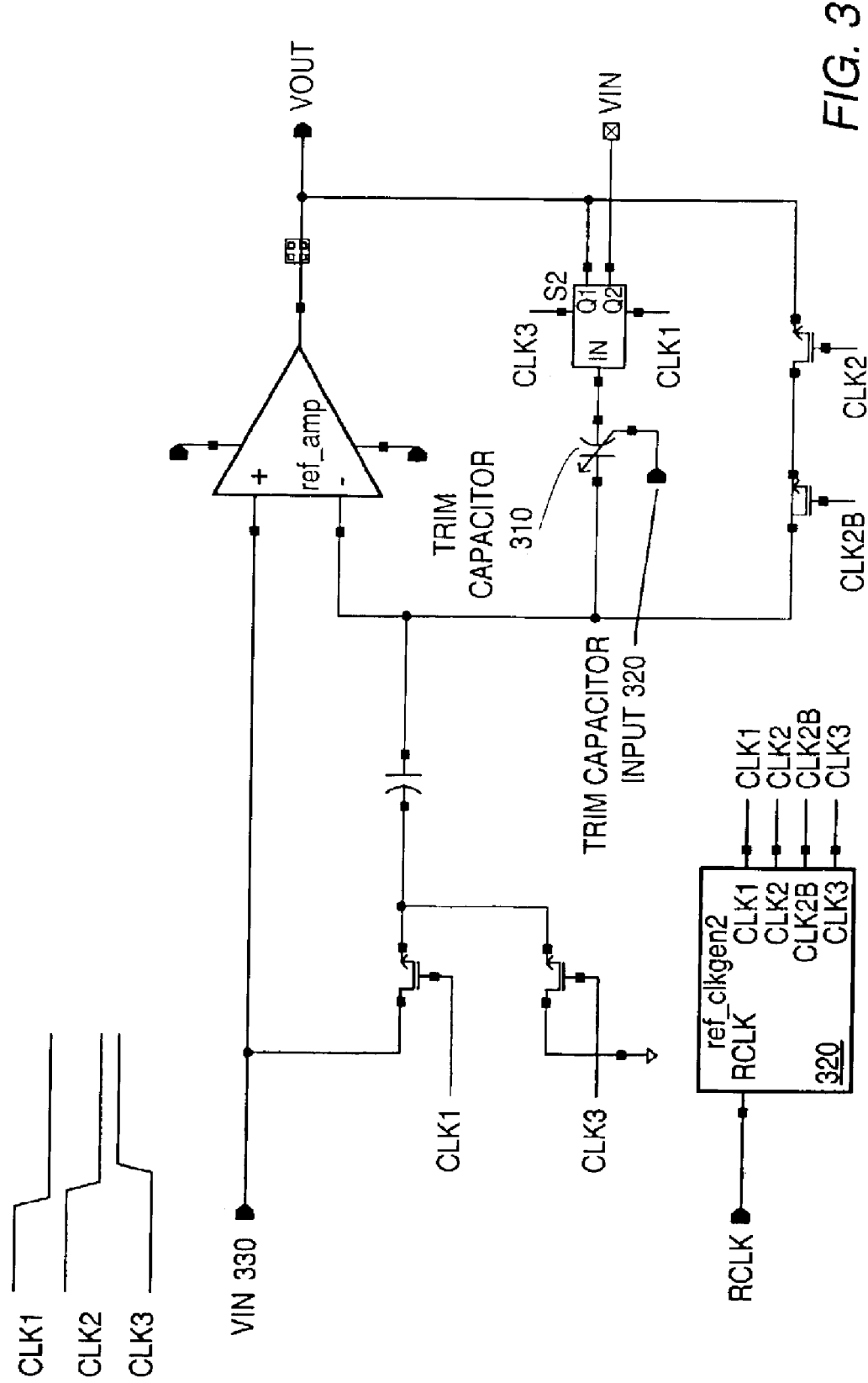
FIG. 3 illustrates one embodiment of a gain stage for a voltage reference amplifier in accordance with prior art.
Figure 4:
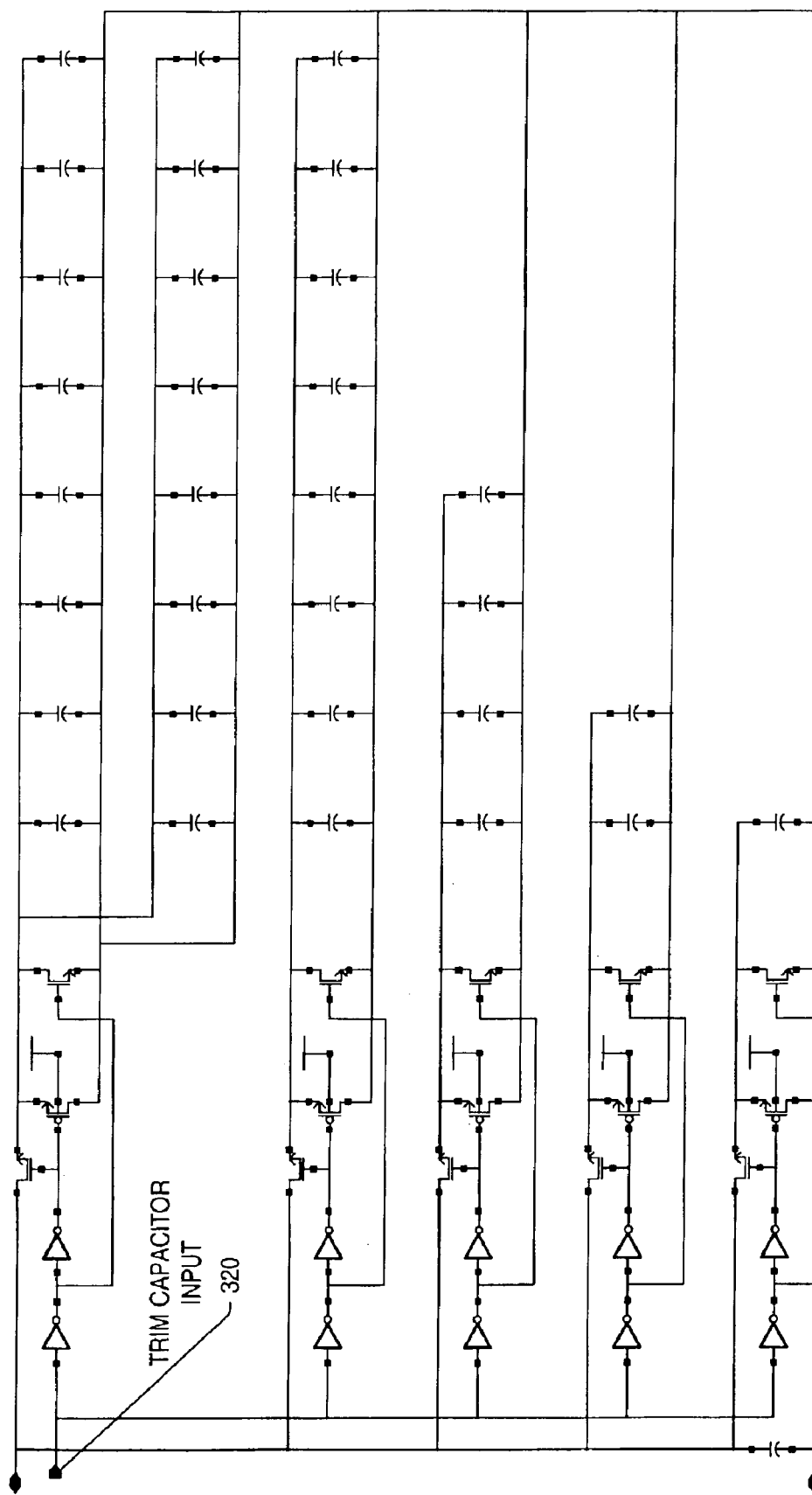
FIG. 4 illustrates one embodiment of a variable capacitor in accordance with prior art.

FIG. 3 presents one of many possible embodiments of a gain stage for VRA 112. In this embodiment, the gain stage includes a Trim Capacitor 310. Gain Control 126 from DIGF 108 may be connected to Trim Capacitor Input 320, and Original Voltage Reference 110 may be connected to Vin 300. One embodiment of Trim Capacitor 310 is illustrated in FIG. 4.

Figure 5:
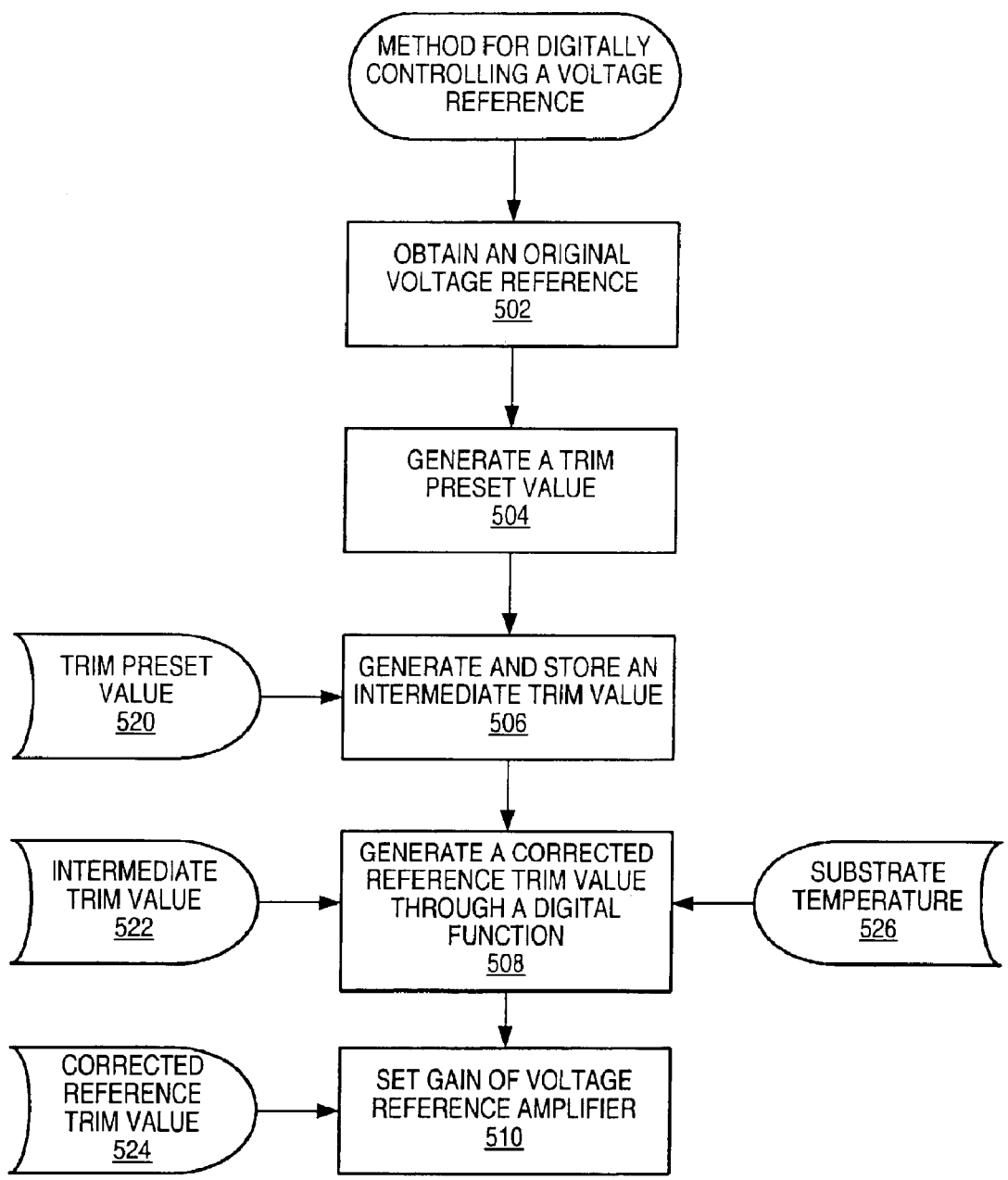
FIG. 5 illustrates a method for dynamically, digitally controlling a temperature compensated voltage reference, implemented in accordance with one set of embodiments of the present invention While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

One embodiment of a method for digitally controlling a voltage reference is illustrated by a flowchart in FIG. 5. An original voltage reference is obtained (502), which may be a voltage reference derived from a band gap. A trim preset value is generated (504). The trim preset value may be determined during characterization and probe, and may be generated by cutting (or leaving uncut) fuses. The cutting may be performed using laser trimming-devices. An intermediate trim value is generated and stored (506). The intermediate trim value may be user defined and may be stored in a register, with the trim preset value provided to the register as a preset value of the register (520). A corrected reference trim value is generated by a digital function (508). Inputs to the digital function may comprise the intermediate trim value (522) and a substrate temperature value (526). The substrate temperature value may be provided by a monolithic temperature monitor. The corrected reference value is used (524) to set a gain of a voltage reference amplifier (510).

In one embodiment, the input of the voltage reference amplifier is the original voltage reference, and the output is a derived voltage reference, which is the controlled voltage reference used by a host system requiring a voltage reference.

Thus, various embodiments of the systems and methods described above may facilitate the digital and dynamic control of a temperature compensated voltage reference for use by systems that require a voltage reference.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for digitally controlling a voltage reference, the method comprising:

obtaining an original voltage reference;

generating a trim preset value by performing an initial trimming of the original voltage reference;

generating an intermediate trim value based on the preset trim value;

generating a corrected reference trim value, based on the intermediate trim value and a substrate temperature value; and setting a gain for a voltage reference amplifier, based on the corrected reference trim value;

wherein said generating the corrected reference trim value is a digitally implemented function;

wherein an input of the voltage reference amplifier is the original voltage reference; and wherein an output of the voltage reference amplifier is a derived voltage reference.

2. The method of claim 1 further comprising deriving the original voltage reference from a band gap reference.

3. The method of claim 1, wherein said performing the initial trimming of the original voltage reference comprises one of:

cutting one or more of a plurality of fuses; and cutting none of the plurality of fuses.

4. The method of claim 3, wherein said cutting of one or more of the plurality of fuses is accomplished with the use of a laser trimming-device.

5. The method of claim 3 further comprising the plurality of fuses controlling a preset value of a storage element.

6. The method of claim 5, wherein the storage element is a register.

7. The method of claim 5, wherein the storage element is a non-volatile memory.

8. The method of claim 5, wherein the preset value of the storage element is set to the trim preset value.

9. The method of claim 5 further comprising the storage element being read from and written to by one or more of:

a host system; and a tester.

10. The method of claim 5 further comprising:

storing the intermediate trim value in the storage element; and providing the intermediate trim value as an output of the storage element.

11. The method of claim 1, wherein said generating the trim preset value is performed to a default temperature value.

12. The method of claim 1, wherein said generating the intermediate trim value is performed to an operating temperature range.

13. The method of claim 1 further comprising:

a monolithic temperature-monitor measuring the substrate temperature value; and the monolithic temperature-monitor providing the substrate temperature value as an input to the digital function.

14. The method of claim 13, wherein a sensor of the monolithic temperature-monitor is on the same die as the derived voltage reference.

15. A digitally adjusted voltage reference system, the system comprising:

an original voltage reference;

a storage element;

a digital function block; and a voltage reference amplifier;

wherein the storage element is operable to store an intermediate trim value;

wherein the digital function block is operable to receive the intermediate trim value;

wherein an input of the voltage reference amplifier is the original voltage reference;

wherein the digital function block generates one or more control signals to control a gain of the voltage reference amplifier; and wherein an output of the voltage reference amplifier is a derived voltage reference.

16. The system of claim 15, wherein the original voltage reference is derived from a band gap reference.

17. The system of claim 15 further comprising a plurality of fuses;

wherein each fuse of the plurality of fuses is coupled to a respective preset and/or reset input of the storage element;

wherein a trim preset value is generated by performing one of:

cutting one or more of the plurality of fuses; and cutting none of the plurality of fuses; and wherein the storage element is operable to receive the trim preset value as an initial value.

18. The system of claim 17, wherein said cutting one or more of the plurality of fuses is accomplished with the use of a laser trimming-device.

19. The system of claim 15 further comprising a monolithic temperature-monitor;

wherein the monolithic temperature-monitor is operable to measure the substrate temperature value; and wherein the monolithic temperature-monitor is operable to provide the substrate temperature value as an input to the digital function block.

20. The system of claim 19, wherein a sensor of the monolithic temperature-monitor is on the same die as the derived voltage reference.

21. The system of claim 15, wherein the storage element is operable to be read from and written to by one or more of:

a host system; and a tester.

22. The system of claim 15, wherein the digital function block comprises one or more algorithms implemented in hardware.

23. The system of claim 15, wherein the digital function block obtains its output values from one or more lookup tables.

24. The system of claim 15, wherein the digital function block is user programmable.

25. The system of claim 15, wherein the storage element comprises one or more D flip-flops.

26. The system of claim 15, wherein the storage element comprises non-volatile memory.

* * * * *